UNITED STATES PATENT OFFICE.

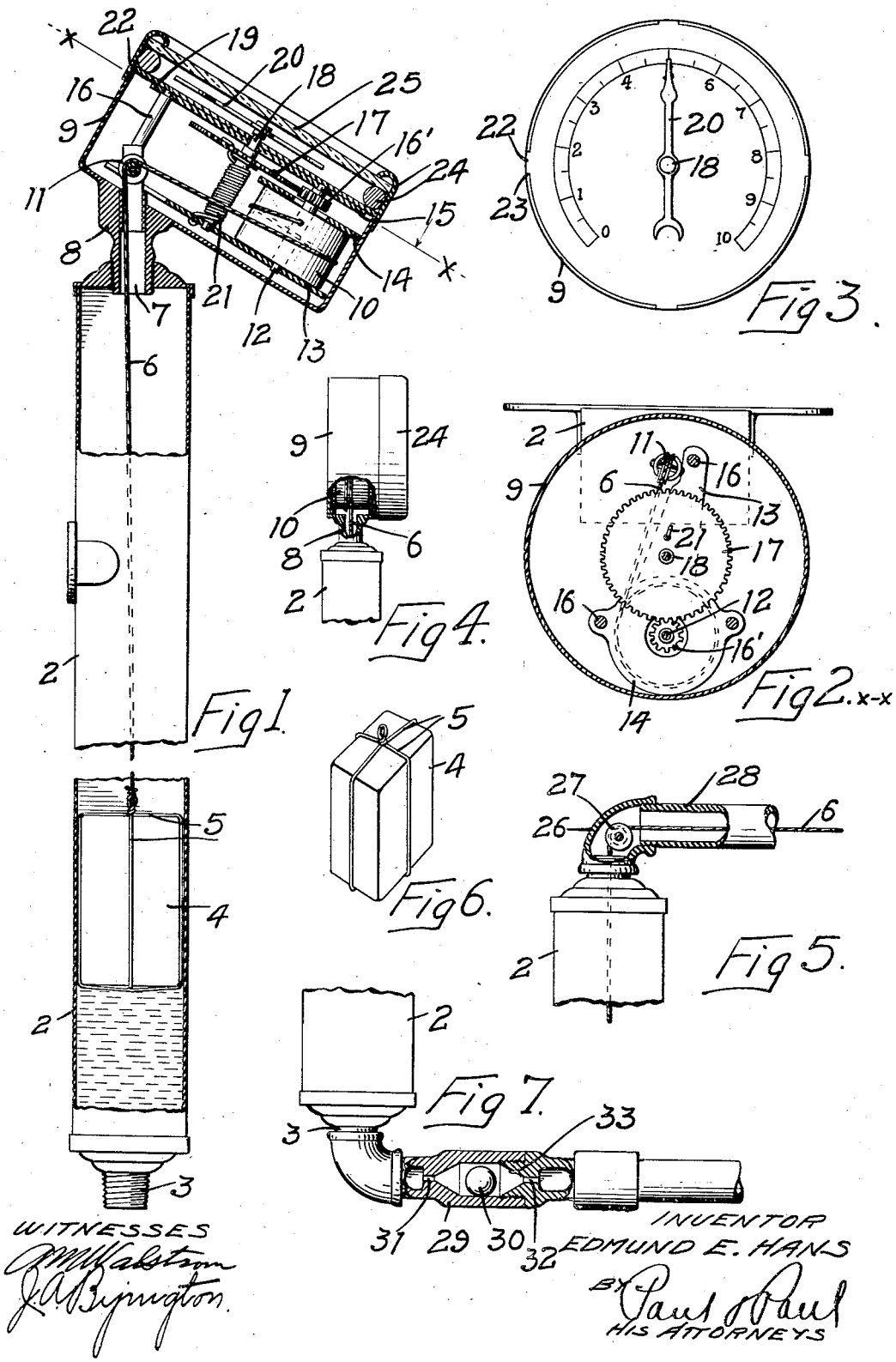

EDMUND E. HANS, OF MINNEAPOLIS, MINNESOTA.

LIQUID-INDICATOR.

943,596.

Specification of Letters Patent.  Patented Dec. 14, 1909.

Application filed April 20, 1908. Serial No. 427,990.

*To all whom it may concern:*

Be it known that I, EDMUND E. HANS, of Minneapolis, Hennepin county, Minnesota, have invented certain new and useful Improvements in Liquid-Indicators, of which the following is a specification.

This invention relates to improvements in indicators for measuring the height of liquids in a tank or other receptacle, and while capable of use for indicating the height of various kinds of liquids, it is designed and adapted particularly for use in connection with the gasolene tank of an automobile to enable the driver to determine at a glance the height of the gasolene in his tank.

The invention consists generally in various constructions and combinations, all as hereinafter described and particularly pointed out in the claims.

In the accompanying drawings, forming part of this specification; Figure 1 is a sectional view of an indicator embodying my invention. Fig. 2 is a sectional view on the line $x$—$x$ of Fig. 1. Fig. 3 is a front view of the dial showing the manner of mounting the dial in the case. Fig. 4 is a detail view showing the drum or barrel on which the float cord is wound mounted directly above the float chamber. Fig. 5 is a detail view illustrating the means employed to adapt the device for use where the dial is located at a distance from the float chamber. Fig. 6 is a perspective view of the float showing the means employed to prevent it from sticking to the walls of the chamber. Fig. 7 is a detail view partially in section illustrating the means employed to prevent the device from becoming inoperative or inactive while running up or down hill.

In the drawing, 2 represents a float chamber having a connection 3 at its lower end for attachment to the pipe leading to the gasolene tank. The gasolene in the tank will flow into the chamber 3 and seek to establish its level therein. A float 4 of cork, aluminum, or any other suitable material, is provided within the float tank and capable of vertical movement therein. A frame 5, preferably of wire, incloses the float and prevents its flat surface from adhering to the walls of the chamber and interfering with the accuracy of the indicator. A cord 6 is' attached to the frame 5 and extends up through a passage 7 in a stud 8 that is mounted on the rear wall of the indicator casing 9. This casing contains the indicator operating mechanism and consists preferably of a drum 10 to which one end of the cord 6 is attached after passing through the opening 7 and over the friction roller 11. The shaft 12 of the drum is mounted in plates 13, 14 and 15 which are held in place by posts 16. The plates 13 and 14 form flanges for the drum 10 and prevent the cord from running off the ends thereof. The shaft 12 has a pinion 16' between the plates 14 and 15 which meshes with a gear wheel 17 on a centrally arranged spindle 18 which is journaled in the plates 13 and 15 and the dial plate 19 and carries an indicator hand 20. A spring 21 is coiled around the spindle 18 and normally tends to swing the indicator hand to the highest point on the dial. The dial plate 19 has a series of lugs 22 adapted to enter notches 23 in the edge of the casing and the casing is exteriorly threaded to receive a locking ring 24 which has an inwardly turned edge to bear on the glass plate 25. As the float 4 rises in the float chamber the cord 6 will be wound upon the drum 10 through the power of the spring 21 and the indicator hand will move over the face of the dial. As the liquid falls in the float chamber the float will descend and unwind the cord and move the indicator hand toward its zero position. The driver of the car is thus able to determine accurately at a glance the amount of gasolene in his tank.

Sometimes it is desirable to locate the indicator at a distance from the float chamber. In that case I provide an elbow 26 having an anti-friction wheel 27 mounted therein over which the cord passes and into a pipe 28 to the casing (not shown) and located at any suitable distance.

It often happens in running up or down hill that the gasolene will flow into the float chamber and either indicate incorrectly the level of gasolene in the tank or convey an entirely erroneous idea of the quantity in the tank, this being due to the inclined position of the car. To obviate this difficulty I provide a casing 29 located in the pipe between the float chamber and the gasolene tank and containing a ball valve 30 and having ports 31 and 32, one leading to the float chamber and the other to the tank. Sufficient space is provided between the ball 30 and the wall of the casing to allow the passage of the gasolene, but the ends of the casing have tapered surfaces 33 against which the ball is seated by the weight of the gasolene, and the passage of the oil past the ball temporarily prevented. For instance in going up hill the ball will roll back and cover the port 32 and prevent the gasolene in the float chamber from flowing back into the tank, and in going down hill the port 31 will be closed and the oil in the tank prevented from flowing into the float chamber. In running on level ground the ball will occupy a neutral position between the ports and in no way interfere with the accuracy of the instrument.

I claim as my invention:

1. A liquid indicator comprising a float chamber having means for connection with a liquid supply pipe, a float slidably arranged within said chamber, a wire looped around said float and arranged to contact with the wall of said chamber and prevent the float from sticking therein, a flexible connection for said float, a drum whereto said flexible connection is attached, a spring for said drum, an indicator and a dial, and a casing inclosing said drum and operating mechanism.

2. A liquid indicator, comprising a float chamber having means for connection with a supply pipe, an indicator casing having a hollow stud fitting within one end of said float chamber, said casing being inclined with respect to the longitudinal axis of said float chamber, a spring actuated drum mounted in said casing, an indicator hand having a post geared to said drum, said drum being located to one side of the passage leading from said casing to said float chamber, anti-friction roller mounted in said casing in line with said passage, a float provided within said float chamber and flexible means connected at one end to said float and passing over said anti-friction roller and attached at its other end to said drum, substantially as described.

3. In a liquid indicator, a suitable casing, plates 13, 14 and 15 arranged parallel with one another therein and posts connecting them, a revolving drum interposed between said plates 13 and 14 and guarded at the ends thereby, and a cord attached to said drum and adapted to be wound thereon and held in place by said plates.

4. A liquid indicator, comprising a float chamber, a spring actuated drum and a casing therefor, said drum being mounted out of line with the longitudinal axis of said chamber, an indicator hand having a post geared to said drum, a float provided in said chamber, flexible means attached at one end to said drum and at its other end to said float, said float chamber having means provided with a passage communicating with said casing, and an anti-friction roller mounted in said passage and with which said flexible means contacts, substantially as described.

5. A liquid indicator comprising a float chamber, a float adapted to move vertically therein, an indicator operating mechanism having flexible connection with said float and means whereby the level of the liquid is maintained in said chamber on an incline as well as on level ground said means including a gravity ball and seats therefor having tapered walls and a curved surface between them whereon said ball normally rests, substantially as described.

6. In a liquid indicator, the combination with a float chamber and float, of a fluid supply pipe connected with said chamber and having ports therein and seats, and a curved surface between said seats, the walls of said seats being inclined inwardly from said curved surface and a ball valve within said supply pipe and normally resting upon said curved surface when said pipe is horizontal but adapted to move from its normal position and close one of said ports when said pipe is tilted, as in running up or down hill.

7. A liquid indicator, comprising a casing, plates arranged therein and having posts conecting them with one another, a revolving drum interposed between said plates and guarded at the ends thereby and a cord attached to said drum and adapted to be wound thereon and held on said drum by said plates.

8. A liquid indicator, comprising a float chamber, an indicator casing inclined with respect to the longitudinal axis of said chamber, a spring actuated drum mounted in said casing, and an indicator hand having a post geared to said drum, said chamber having means provided with a passage leading therefrom to said casing, an anti-friction roller mounted in said passage, a float provided within said float chamber, and flexible means connected at one end to said float and contacting with said roller and attached to said drum.

9. A liquid indicator comprising a float chamber, an indicator casing mounted out of line with the longitudinal axis of said float chamber, a spring actuated drum mounted in said casing, an indicator hand connected with said drum, an anti-friction roller mounted in line with the passage through said float chamber, a float provided in said chamber, and flexible means connected at one end with said float and contacting with said anti-friction roller and attached at its other end to said drum, substantially as described.

In witness whereof, I have hereunto set my hand this 10th day of April 1908.

EDMUND E. HANS.

Witnesses:
J. A. BYINGTON,
C. G. HANSON.